(12) United States Patent
Liu et al.

(10) Patent No.: US 10,535,845 B1
(45) Date of Patent: Jan. 14, 2020

(54) FLEXIBLE AND STRETCHABLE CHAIN BATTERY

(71) Applicant: Flex Ltd., Singapore (SG)

(72) Inventors: Weifeng Liu, Dublin, CA (US); William Uy, San Jose, CA (US); Zhen Feng, San Jose, CA (US); Anwar Mohammed, San Jose, CA (US); Murad Kurwa, San Jose, CA (US)

(73) Assignee: Flex Ltd., Singapore (SG)

( * ) Notice: Subject to any disclaimer, the term of this patent is extended or adjusted under 35 U.S.C. 154(b) by 243 days.

(21) Appl. No.: 15/649,981

(22) Filed: Jul. 14, 2017

(51) Int. Cl.
*H01M 2/02* (2006.01)
*H01M 2/10* (2006.01)

(52) U.S. Cl.
CPC ....... *H01M 2/0275* (2013.01); *H01M 2/0207* (2013.01); *H01M 2/0212* (2013.01); *H01M 2/1066* (2013.01); *H01M 2002/0205* (2013.01)

(58) Field of Classification Search
None
See application file for complete search history.

(56) References Cited

U.S. PATENT DOCUMENTS

| | | | | |
|---|---|---|---|---|
| 3,708,349 A | * | 1/1973 | Macaulay | H01M 6/48 29/623.3 |
| 3,993,508 A | * | 11/1976 | Erlichman | H01M 6/48 29/623.2 |
| 4,367,572 A | * | 1/1983 | Zielenski | B60R 16/04 180/68.5 |
| 4,492,949 A | | 1/1985 | Peterson | |
| 4,722,464 A | * | 2/1988 | Wright | G11B 33/025 224/235 |
| 4,756,717 A | * | 7/1988 | Sturgis | H01M 6/48 29/623.3 |
| 5,626,135 A | | 5/1997 | Sanfilippo | |
| 6,370,034 B1 | | 4/2002 | Busch | |
| 6,534,723 B1 | | 3/2003 | Asai | |
| 6,830,848 B1 | * | 12/2004 | Fujiwara | H01M 4/137 429/213 |
| 6,891,272 B1 | | 5/2005 | Fjelstad | |
| 6,964,205 B2 | | 11/2005 | Papakostas | |
| 7,456,571 B1 | | 11/2008 | Wedding | |
| 7,578,195 B2 | | 8/2009 | DeAngelis | |
| 8,519,270 B2 | | 8/2013 | Chang | |

(Continued)

OTHER PUBLICATIONS

Non-Final Office Action dated Mar. 22, 2019, U.S. Appl. No. 15/249,024, filed Aug. 26, 2016, applicant:Michael James Glickman, dated Mar. 22, 2019, 22 pages.

(Continued)

*Primary Examiner* — Rena Dye Cronin
(74) *Attorney, Agent, or Firm* — Haverstock & Owens LLP

(57) ABSTRACT

A flexible and stretchable chain battery includes multiple individual batteries connected in parallel and/or in series via stretchable conductive interconnects. The positive terminals of each battery are connected to a first stretchable conductive interconnect and the negative terminals of each battery are connected to a second stretchable conductive interconnect. The stretchable conductive interconnects and the batteries are coupled to a stretchable substrate. The stretchable conductive interconnects provide electrical interconnection between the multiple batteries while enabling stretchability between the batteries.

22 Claims, 7 Drawing Sheets

(56) References Cited

U.S. PATENT DOCUMENTS

| | | |
|---|---|---|
| 8,918,991 B2 | 12/2014 | Ao |
| 9,035,197 B2 | 5/2015 | Ao |
| 9,340,003 B2 | 5/2016 | Chang |
| 9,480,141 B1 | 10/2016 | Harnadeh |
| 9,936,581 B1 | 4/2018 | Bergman |
| 10,117,328 B1 | 10/2018 | Zhong |
| 2004/0094835 A1 | 5/2004 | Maghribi |
| 2004/0243204 A1 | 12/2004 | Maghribi |
| 2004/0262036 A1 | 12/2004 | Brist |
| 2005/0122700 A1 | 6/2005 | Kim |
| 2006/0072944 A1 | 4/2006 | Sharma |
| 2007/0137891 A1 | 6/2007 | Fan |
| 2007/0215883 A1 | 9/2007 | Dixon |
| 2008/0018611 A1 | 1/2008 | Serban |
| 2008/0044127 A1 | 2/2008 | Leising |
| 2008/0139953 A1 | 6/2008 | Baker |
| 2009/0102580 A1 | 4/2009 | Uchaykin |
| 2009/0272197 A1 | 11/2009 | Ridao Granado |
| 2010/0160762 A1 | 1/2010 | McLaughlin |
| 2010/0037497 A1 | 2/2010 | Anelevitz |
| 2010/0063365 A1 | 3/2010 | Pisani |
| 2010/0107770 A1 | 5/2010 | Serban |
| 2010/0185076 A1 | 7/2010 | Jeong |
| 2011/0114376 A1 | 5/2011 | Shoji |
| 2012/0052268 A1 | 3/2012 | Axisa |
| 2013/0019383 A1 | 1/2013 | Korkala |
| 2013/0060115 A1 | 3/2013 | Gehman |
| 2013/0220535 A1 | 8/2013 | Lee |
| 2014/0124245 A1 | 5/2014 | Lai |
| 2014/0190727 A1 | 7/2014 | Lee |
| 2014/0209690 A1 | 7/2014 | Teng |
| 2014/0343390 A1 | 11/2014 | Berzowska |
| 2015/0065840 A1 | 3/2015 | Bailey |
| 2015/0280280 A1* | 10/2015 | Ardebili ............ H01M 10/0525 429/127 |
| 2015/0366504 A1 | 12/2015 | Connor |
| 2015/0380355 A1* | 12/2015 | Rogers ................. H01L 23/538 257/773 |
| 2016/0007468 A1 | 1/2016 | Tomikawa |
| 2016/0165723 A1 | 6/2016 | Romero |
| 2016/0183372 A1 | 6/2016 | Park |
| 2016/0372718 A1* | 12/2016 | Keates ................ H01M 2/0275 |
| 2017/0172421 A1 | 6/2017 | Dabby |
| 2017/0358841 A1 | 12/2017 | Chen |
| 2017/0365644 A1 | 12/2017 | Zheng |
| 2018/0070446 A1 | 3/2018 | Takahashi |

OTHER PUBLICATIONS

Final office action dated Mar. 29, 2019. U.S. Appl. No. 14/124,673, filed May 28, 2015, Applicant: Weifeng Liu, 27 p[ages.

Non final office action dated Apr. 1, 2019. U.S. Appl. No. 15/995,965, filed Jun. 1, 2018, Applicant: Weifeng Liu, 29 pages.

* cited by examiner

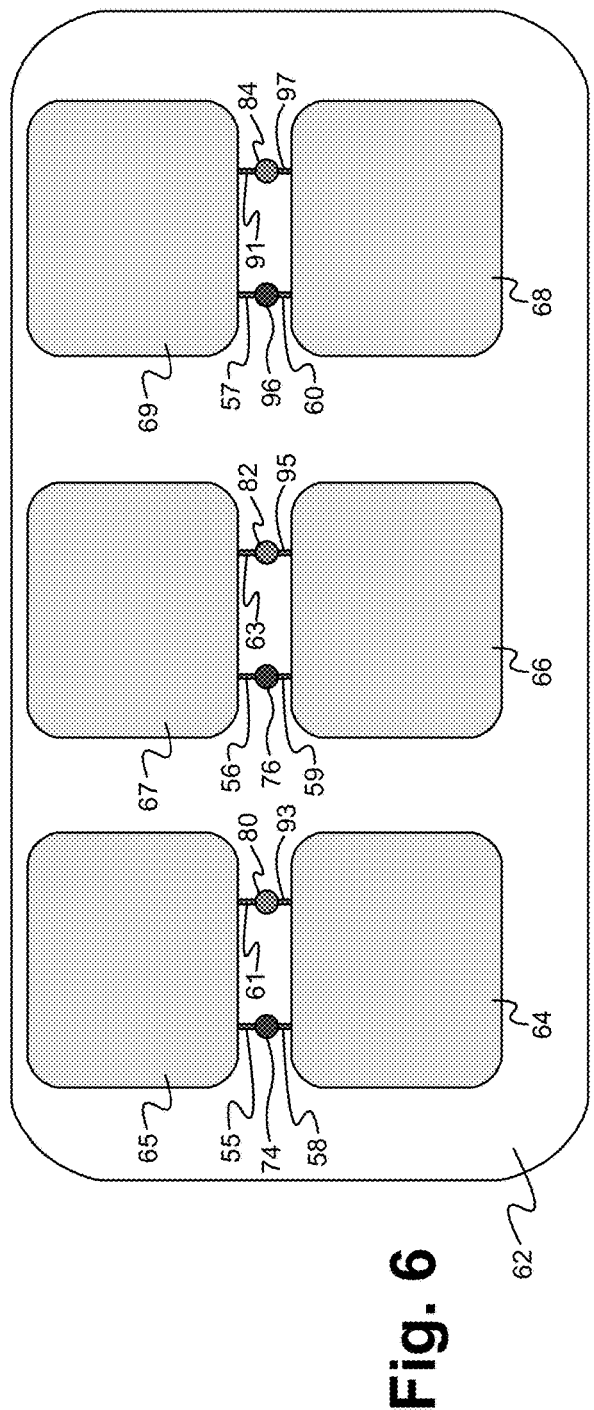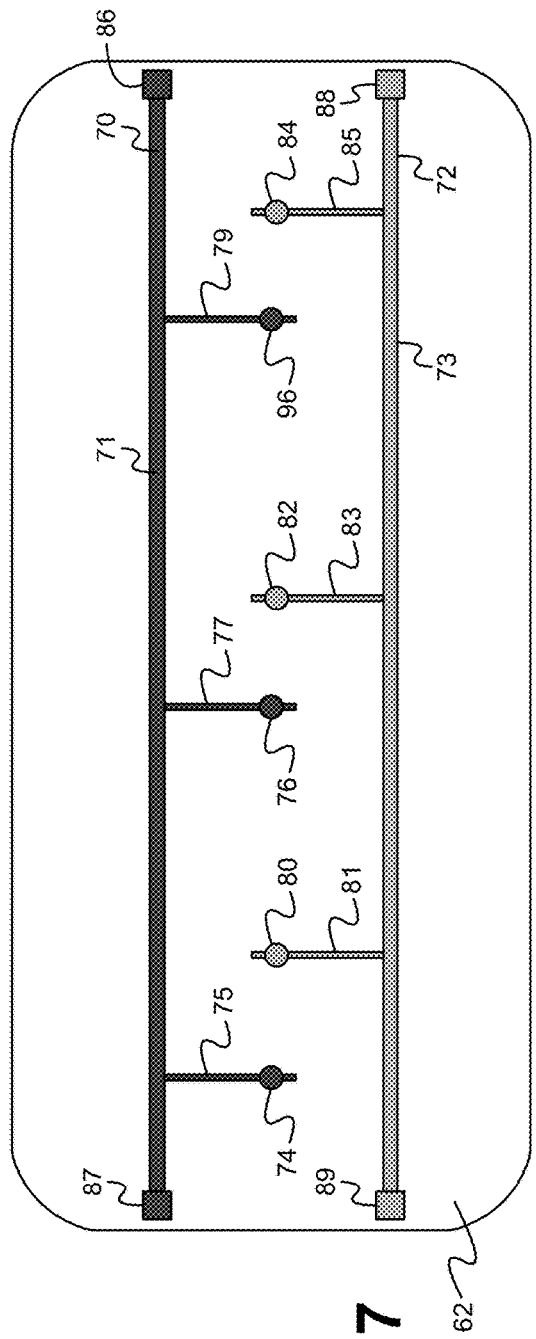

FLEXIBLE AND STRETCHABLE CHAIN BATTERY

FIELD OF THE INVENTION

The present invention is generally directed to energy storage such as batteries. More specifically, the present invention is directed to a flexible and stretchable chain battery.

BACKGROUND OF THE INVENTION

Conventional battery and power storage are made to be confined in a non-deformable solid container, such as a rigid battery shell. The solid shell restrict the deformation of the structure, which restricts the uses of the conventional batteries.

SUMMARY OF THE INVENTION

A flexible and stretchable chain battery includes multiple individual batteries connected in parallel and/or in series via stretchable conductive interconnects. The positive terminals of each battery are connected to a first stretchable conductive interconnect and the negative terminals of each battery are connected to a second stretchable conductive interconnect. The stretchable conductive interconnects and the batteries are coupled to a stretchable substrate. The stretchable conductive interconnects provide electrical interconnection between the multiple batteries while enabling stretchability between the batteries.

In an aspect, a flexible and stretchable chain battery is disclosed. The chain battery includes a stretchable substrate, a first stretchable conductive interconnect coupled to the stretchable substrate, a second stretchable conductive interconnect coupled to the stretchable substrate, and a plurality of batteries. Each battery comprises a positive terminal and a negative terminal. The positive terminal of each battery is coupled to the first stretchable conductive interconnect and the negative terminal of each battery is coupled to the second stretchable conductive interconnect. In some embodiments, each battery comprises a positive terminal battery tab that extends beyond a footprint of the battery and a negative terminal battery tab that extends beyond a footprint of the battery. In some embodiments, the positive terminal battery tab of each battery is mechanically and electrically connected to the first stretchable conductive interconnect and the negative terminal battery tab of each battery is mechanically and electrically connected to the second stretchable conductive interconnect. In some embodiments, a flexible adhesive selectively adheres the first stretchable conductive interconnect to the stretchable substrate and selectively adheres the second stretchable conductive interconnect to the stretchable substrate. In some embodiments, the first stretchable conductive interconnect comprises a first end having a first contact pad and a second end having a second contact pad, and the second stretchable conductive interconnect comprises a first end having a first contact pad and a second end having a second contact pad. In some embodiments, the stretchable substrate comprises one of an elastic polymer, elastomer, silicone, urethane, polydimethlsiloxane (PDMS), latex, spandex or thermoplastic polyurethane film. In another aspect, another flexible and stretchable chain battery is disclosed. The chain battery includes a stretchable substrate having a first surface and an opposing second surface, a first stretchable conductive interconnect coupled to the first surface of the stretchable substrate, a second stretchable conductive interconnect coupled to the first surface of the stretchable substrate, and a plurality of batteries coupled to the first stretchable conductive interconnect, the second stretchable conductive interconnect and the first surface of the stretchable substrate. Each battery comprises a positive terminal and a negative terminal. The positive terminal of each battery is coupled to the first stretchable conductive interconnect and the negative terminal of each battery is coupled to the second stretchable conductive interconnect. In some embodiments, each battery comprises a positive terminal battery tab that extends beyond a footprint of the battery and a negative terminal battery tab that extends beyond a footprint of the battery. In some embodiments, the positive terminal battery tab of each battery is mechanically and electrically connected to the first stretchable conductive interconnect and the negative terminal battery tab of each battery is mechanically and electrically connected to the second stretchable conductive interconnect. In some embodiments, a flexible adhesive selectively adheres the first stretchable conductive interconnect to the stretchable substrate and selectively adheres the second stretchable conductive interconnect to the stretchable substrate. In some embodiments, the first stretchable conductive interconnect comprises a first end having a first contact pad and a second end having a second contact pad, and the second stretchable conductive interconnect comprises a first end having a first contact pad and a second end having a second contact pad. In some embodiments, the stretchable substrate comprises one of an elastic polymer, elastomer, silicone, urethane, polydimethlsiloxane (PDMS), latex, spandex or thermoplastic polyurethane film. In some embodiments, each battery is positioned between the first stretchable conductive interconnect and the stretchable substrate and positioned between the second stretchable conductive interconnect and the stretchable substrate. In some embodiments, a portion of the first stretchable conductive interconnect and a portion of the second stretchable conductive interconnect are positioned between each battery and the stretchable substrate. In some embodiments, each battery is coupled to the portion of the first stretchable conductive interconnect and the portion of the second stretchable conductive interconnect by an adhesive.

In yet another aspect, another flexible and stretchable chain battery is disclosed. The chain battery includes a stretchable substrate having a first surface and an opposing second surface, a plurality of tab connectors extending through the stretchable substrate from the first surface to the second surface, a first stretchable conductive interconnect coupled to the second surface of the stretchable substrate and to a first set of the plurality of tab connectors, a second stretchable conductive interconnect coupled to the second surface of the stretchable substrate and to a second set of the plurality of tab connectors, and a plurality of batteries coupled to the first surface of the stretchable substrate. Each battery comprises a positive terminal and a negative terminal. The positive terminal of each battery is coupled to one of the first set of tab connectors and the negative terminal of each battery is coupled to one of the second set of tab connectors. The plurality of tab connectors are electrically conductive. In some embodiments, each battery comprises a positive terminal battery tab that extends beyond a footprint of the battery and a negative terminal battery tab that extends beyond a footprint of the battery. In some embodiments, the positive terminal battery tab of each battery is mechanically and electrically connected to one of the first set of tab connectors and the negative terminal battery tab of each battery is mechanically and electrically connected to one of the second set of tab connectors. In some embodiments, a flexible adhesive selectively adheres the first stretchable conductive interconnect and the second stretchable conductive interconnect to the second surface of the stretchable substrate. In some embodiments, the first stretchable conductive interconnect comprises a first end having a first contact pad and a second end having a second contact pad, and the second stretchable conductive interconnect comprises a first end having a first contact pad and a second end having a second contact pad. In some embodiments, the stretchable substrate comprises one of an elastic polymer, elastomer, silicone, urethane, polydimethlsiloxane (PDMS), latex, spandex or thermoplastic polyurethane film. In some embodiments, each battery is coupled to the first surface of the stretchable substrate by an adhesive.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 6 illustrates a top down view of still another flexible and stretchable chain battery according to some embodiments.

FIG. 7 illustrates a bottom up view of the flexible and stretchable chain battery of FIG. 6.

DETAILED DESCRIPTION OF THE EMBODIMENTS

Figure 1:
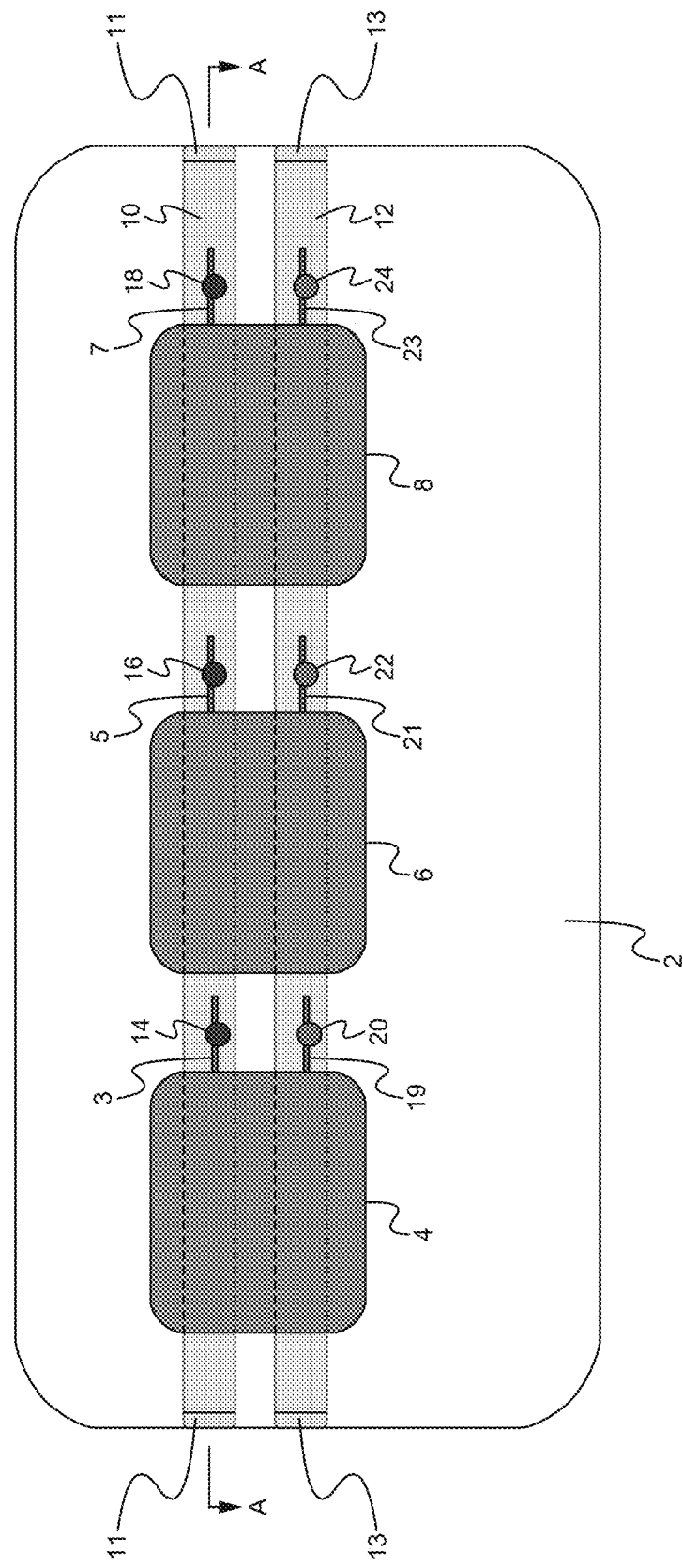
FIG. 1 illustrates a top down view of a flexible and stretchable chain battery according to some embodiments.

Embodiments of the present application are directed to a flexible and stretchable chain battery. Those of ordinary skill in the art will realize that the following detailed description of the flexible and stretchable chain battery is illustrative only and is not intended to be in any way limiting. Other embodiments of the flexible and stretchable chain battery will readily suggest themselves to such skilled persons having the benefit of this disclosure.

Reference will now be made in detail to implementations of the flexible and stretchable chain battery as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments are directed to a flexible and stretchable chain battery that includes a stretchable substrate, stretchable conductive interconnects, and batteries. Each battery can be any conventional battery including, but not limited to, a lithium ion battery, a lithium battery, a carbon zinc battery or an alkaline battery, in different thicknesses and form factors. The stretchable substrate is made of an electrically non-conductive, stretchable material. Examples of such materials that can be used to form the stretchable substrate include, but are not limited to, an elastic polymer, or elastomer, which is a polymer with viscoelasticity, silicone, urethane, polydimethlsiloxane (PDMS), latex or spandex, also referred to as elastane.

A stretchable conductive interconnect is made of a stretchable conductive material including, but not limited to, a stretchable conductive cloth, a stretchable conductive yarn, a stretchable conductive ink, or the like. The embodiments described below refer to stretchable conductive cloth, however it is understood that such reference can generally be applied to other forms of the stretchable conductive interconnect, such as stretchable conductive yarn, stretchable conductive ink, and the like. As used herein, the term "cloth" generally applies to fabric or other similar materials made of threads, fibers, filaments or the like, generally referred to herein as "threads". Materials used for threads can include, but are not limited to, cotton, wool, nylon, polyester or other synthetic materials. Each stretchable conductive cloth is made entirely are partially of electrically conductive material configured to be stretchable. For example, a stretchable conductive cloth can be made entirely of electrically conductive thread woven into a cloth where the non-linear nature of the woven thread enables stretching in one or more directions. Alternatively, electrically conductive thread can be woven with non-conductive thread. Examples of electrically conductive thread include, but are not limited to, cotton, wool, nylon, polyester or other synthetic materials coated with a conductive material such as silver or copper. Electrically conductive thread can also simply be a metal wire, such as a copper wire. In the case where the electrically conductive thread is not itself stretchable, the electrically conductive thread can be formed in a non-linear shape, such as a serpentine shape, such that when the entire cloth is stretched, the non-linear shape has slack that enables "stretching" of the cloth.

FIG. 1 illustrates a top down view of a flexible and stretchable chain battery according to some embodiments. The flexible and stretchable chain battery includes a stretchable substrate 2, a stretchable conductive cloth 10, a stretchable conductive cloth 12, and batteries 4, 6 and 8. The stretchable conductive cloth 10 and the stretchable conductive cloth 12 are coupled to a first surface of the stretchable substrate 2. In some embodiments, the stretchable conductive cloth 10 and the stretchable conductive cloth 12 are attached to the stretchable substrate 2 by a flexible adhesive. In other embodiments, the stretchable conductive cloth 10 and the stretchable conductive cloth 12 are laminated to the stretchable substrate 2. In still other embodiments, the stretchable conductive cloth 10 and the stretchable conductive cloth 12 are printed onto the stretchable substrate 2.

The exemplary configuration shown in FIG. 1 includes three batteries. It is understood that more or less than three batteries can be chained together. The positive terminal of each battery 4, 6, 8 is electrically and mechanically coupled to the stretchable conductive cloth 10, and the negative terminal of each battery 4, 6, 8 is electrically and mechanically coupled to the stretchable conductive cloth 12. In some embodiments, the positive terminal and negative terminal of each battery 4, 6, 8 includes an electrically conductive element, such as a battery tab, that extends beyond a footprint of the battery so as to enable the mechanical and electrical connection with the corresponding stretchable conductive cloth. For example, the positive terminal of the battery 4 includes a battery tab 3 that extends beyond a footprint of the battery 4, and the battery tab 3 is mechanically and electrically coupled to the stretchable conductive cloth 10 forming a tab connection 14. The negative terminal of the battery 4 includes a battery tab 19 that extends beyond a footprint of the battery 4, and the battery tab 19 is mechanically and electrically coupled to the stretchable conductive cloth 12 forming a tab connection 20. Similarly, the positive terminal of the battery 6 includes a battery tab 5 that extends beyond a footprint of the battery 6, and the battery tab 5 is mechanically and electrically coupled to the stretchable conductive cloth 10 forming a tab connection 16. The negative terminal of the battery 6 includes a battery tab 21 that extends beyond a footprint of the battery 6, and the battery tab 21 is mechanically and electrically coupled to the stretchable conductive cloth 12 forming a tab connection 22. The positive terminal of the battery 8 includes a battery tab 7 that extends beyond a footprint of the battery 8, and the battery tab 7 is mechanically and electrically coupled to the stretchable conductive cloth 10 forming a tab connection 18. The negative terminal of the battery 8 includes a battery tab 23 that extends beyond a footprint of the battery 8, and the battery tab 23 is mechanically and electrically coupled to the stretchable conductive cloth 12 forming a tab connection 24. In some embodiments, an adhesive is applied around and/or onto each tab connection to provide additional mechanical connection and environmental protection. In general, each battery tab can be connected to the corresponding stretchable conductive cloth through various connection means including, but not limited to, soldering, welding, conductive adhesive or mechanical clip/fastener.

In some embodiments, the ends of each stretchable conductive cloth 10, 12 can be fitted with an electrical connection point, such as a contact pad 11, 13 or metal fastener, so as to electrically interconnect the stretchable conductive cloth 10, 12 to an external electrical component or other electrical interconnect (not shown). In some embodiments, the electrical component is a printed circuit board assembly (PCBA) or packaged electronic device. An electrical component can be coupled to an electrical connection point on the stretchable conductive cloth using any conventional means that enable electrical connectivity including, but not limited to, soldering, welding or conductive adhesives.

Figure 2:
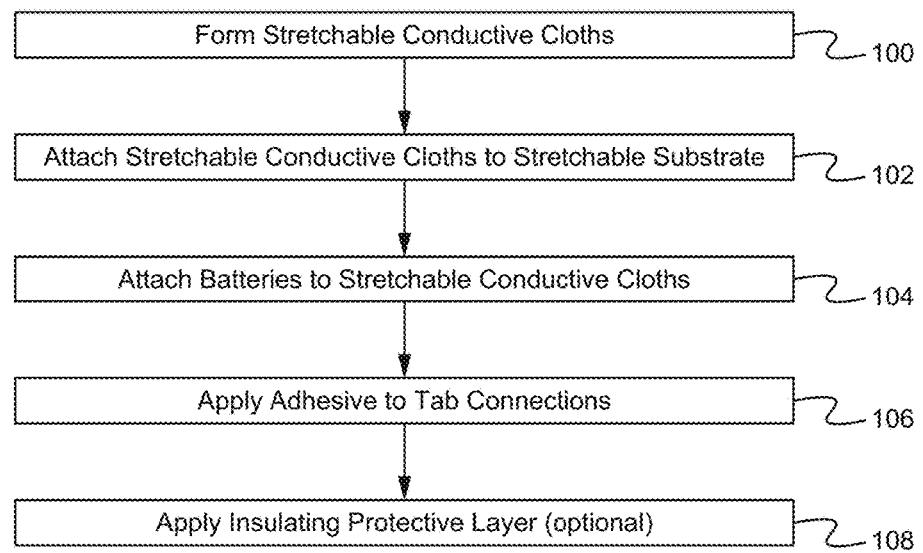
FIG. 2 illustrates a method of making a flexible and stretchable chain battery according to some embodiments.

There are various methodologies of making the flexible and stretchable chain battery. FIG. 2 illustrates a method of making a flexible and stretchable chain battery according to some embodiments. For exemplary purposes, the method of FIG. 2 is described in terms of the flexible and stretchable chain battery of FIG. 1. At the step 100, the stretchable conductive cloth 10 and the stretchable conductive cloth 12 are formed to the desired configurations. In some embodiments, the stretchable conductive cloth 10 and the stretchable conductive cloth 12 are cut, such as by laser cutting or other cutting means, to the desired configurations. It is understood that alternative conventional methods can be used to form the stretchable conductive cloths into the desired configurations. FIG. 1 shows each of the stretchable conductive cloth 10 and the stretchable conductive cloth 12 shaped as rectangular, linear strips. It is understood that the stretchable conductive cloths can be alternatively configured with different shapes and pathways. In some embodiments, electrical interconnect points 11 are formed on each end of the stretchable conductive cloth 10 and electrical interconnect points 13 are formed on each end of the stretchable conductive cloth 12.

At the step 102, the stretchable conductive cloth 10 and the stretchable conductive cloth 12 are attached to a surface of the stretchable substrate 2. In some embodiments, the stretchable conductive cloth 10 and the stretchable conductive cloth 12 are each attached to the stretchable substrate 2 using a flexible adhesive. The flexible adhesive is cured, in some embodiments at room temperature. In some embodiments, the flexible adhesive is applied substantially along an entire contact surface between the stretchable conductive cloth and the stretchable substrate. In this case, the flexible adhesive is an adhesive that has sufficient stretchability to stretch along with the stretchable conductive cloth. In other embodiments, the flexible adhesive not applied along the entire contact surface between the stretchable conductive cloth and the stretchable substrate, but instead is applied at select locations along the contact surface between the stretchable conductive cloth and the stretchable substrate. In this case, the flexible adhesive need not have the same stretchability as the stretchable conductive cloth. In other embodiments, the stretchable conductive cloth 10 and the stretchable conductive cloth 12 are laminated to the stretchable substrate 2. In still other embodiments, where the stretchable conductive interconnect is stretchable conductive ink instead of stretchable conductive cloth, the stretchable conductive interconnects can be printed onto the stretchable substrate. In this case, there is no need to perform step 100.

At the step 104, each of the batteries 4, 6, 8 are selectively attached to the stretchable conductive cloths 10, 12. In particular, the batteries 4, 6, 8 are positioned on the stretchable conductive cloth 10, the stretchable conductive cloth 12 and the stretchable substrate 2 formed at the step 102. The battery 4 is positioned such that the battery tab 3 of the positive terminal is aligned with the stretchable conductive cloth 10 and the battery tab 19 of the negative terminal is aligned with the stretchable conductive cloth 12. Similarly, the battery 6 is positioned such that the battery tab 5 of the positive terminal is aligned with the stretchable conductive cloth 10 and the battery tab 21 of the negative terminal is aligned with the stretchable conductive cloth 12, and the battery 8 is positioned such that the battery tab 7 of the positive terminal is aligned with the stretchable conductive cloth 10 and the battery tab 23 of the negative terminal is aligned with the stretchable conductive cloth 12. The battery tabs 3, 5, 7 are mechanically and electrically connected to the stretchable conductive cloth 10 to form tab connections 14, 16, 18, respectively. The battery tabs 19, 21, 23 are mechanically and electrically connected to the stretchable conductive cloth 12 to form tab connections 20, 22, 24, respectively. In this manner, the positive terminal of each battery 2, 4, 6 is electrically interconnected to the stretchable conductive cloth 10, and the negative terminal of each battery 2, 4, 6 is electrically interconnected to the stretchable conductive cloth 12. Each battery tab 3, 5, 7 can be connected to the stretchable conductive cloth 10 and each battery tab 19, 21, 23 can be connected to the stretchable conductive cloth 12 through any of various connection means including, but not limited to, soldering, welding, conductive adhesive or mechanical clip/fastener. In some embodiments, each battery 4, 6, 8 is mechanically attached to the stretchable conductive cloths 10, 12, the stretchable substrate 2 or a combination of the stretchable conductive cloths 10, 12 and the stretchable substrate 2. Such a mechanical attachment can be formed using, for example, a flexible adhesive applied to an entire or a portion of a contact surface between each battery and the stretchable conductive cloths, the stretchable substrate or both the stretchable conductive cloths and the stretchable substrate. The flexible adhesive can be either of the same or different type as the flexible adhesive used to attach the stretchable conductive cloths 10, 12 to the stretchable substrate 2.

At the step 106, an adhesive is applied over each tab connection 14, 16, 18, 20, 22, 24 to provide additional mechanical connection and environmental protection.

At an optional step 108, an insulting protective layer is applied over the batteries 4, 6, 8 and the stretchable conductive cloths 10, 12. Examples of such an insulating protective cover includes, but is not limited to, a silicon gel, a urethane gel or another layer of the stretchable substrate material. In some embodiments, the electrical interconnect points 11, 33 of each stretchable conductive cloth 10, 12 are left exposed so as to provide external electrical connectivity.

Figure 3:
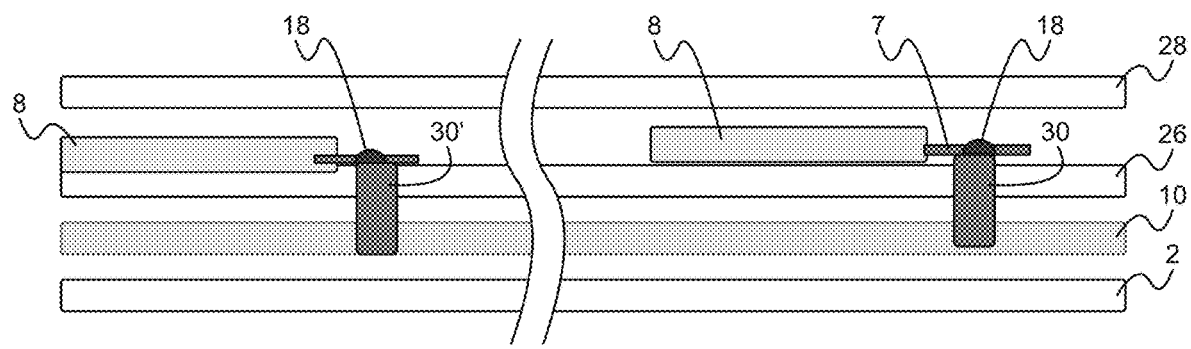
FIG. 3 illustrates a cut out side view of a portion of the flexible and stretchable chain battery of FIG. 1 along the line A-A including a metal fastener.

As described above, a tab connection is formed at the point where the battery tab is connected to the stretchable conductive cloth. In some embodiments, a metal fastener is included to facilitate this connection. The metal fastener can be attached at a surface of the stretchable conductive cloth or the metal fastener can extend through the stretchable conductive cloth providing a connection point on either side of the stretchable conductive cloth. FIG. 3 illustrates a cut out side view of a portion of the flexible and stretchable chain battery of FIG. 1 along the line A-A including a metal fastener. The portion shows the cut-out corresponding to battery 8. The right hand side of FIG. 3 shows a metal fastener 30 attached at a surface of the stretchable conductive cloth 10. In some embodiments, the battery tab 7 includes a first snap element and the metal fastener 30 includes a second snap element. The first snap element and the second snap element are complimentary to each other and form the tab connection 18 when snapped together. The left hand side of FIG. 3 shows a metal fastener 30' that is attached to the stretchable conductive cloth 10 but extends through the entire thickness of the stretchable conductive cloth 10 so as to provide connection points on either surface of the stretchable conductive cloth 10. Providing connection points on both surfaces of the stretchable conductive cloth enables the battery and the stretchable substrate to be positioned on opposite sides of the stretchable conductive cloth, as shown and described in relation to the exemplary embodiments of FIGS. 6 and 7 below. The exemplary configuration shown in FIG. 3 also includes additional optional layers. In some embodiments, additional layers of stretchable substrate can be added for stability, support, insulation, protection or other design considerations. For example, an additional stretchable substrate layer 26 is added over the stretchable conductive cloth 10, and the batteries are attached to the stretchable substrate layer 26. Another stretchable substrate layer 28 can be added over the batteries. The stretchable substrate layers 26, 28 can be the same or different type of material as the stretchable substrate 2. In some embodiments, one or more of the stretchable substrate layers can be a film, such as a TPU (thermoplastic polyurethane) film.

Figure 4:
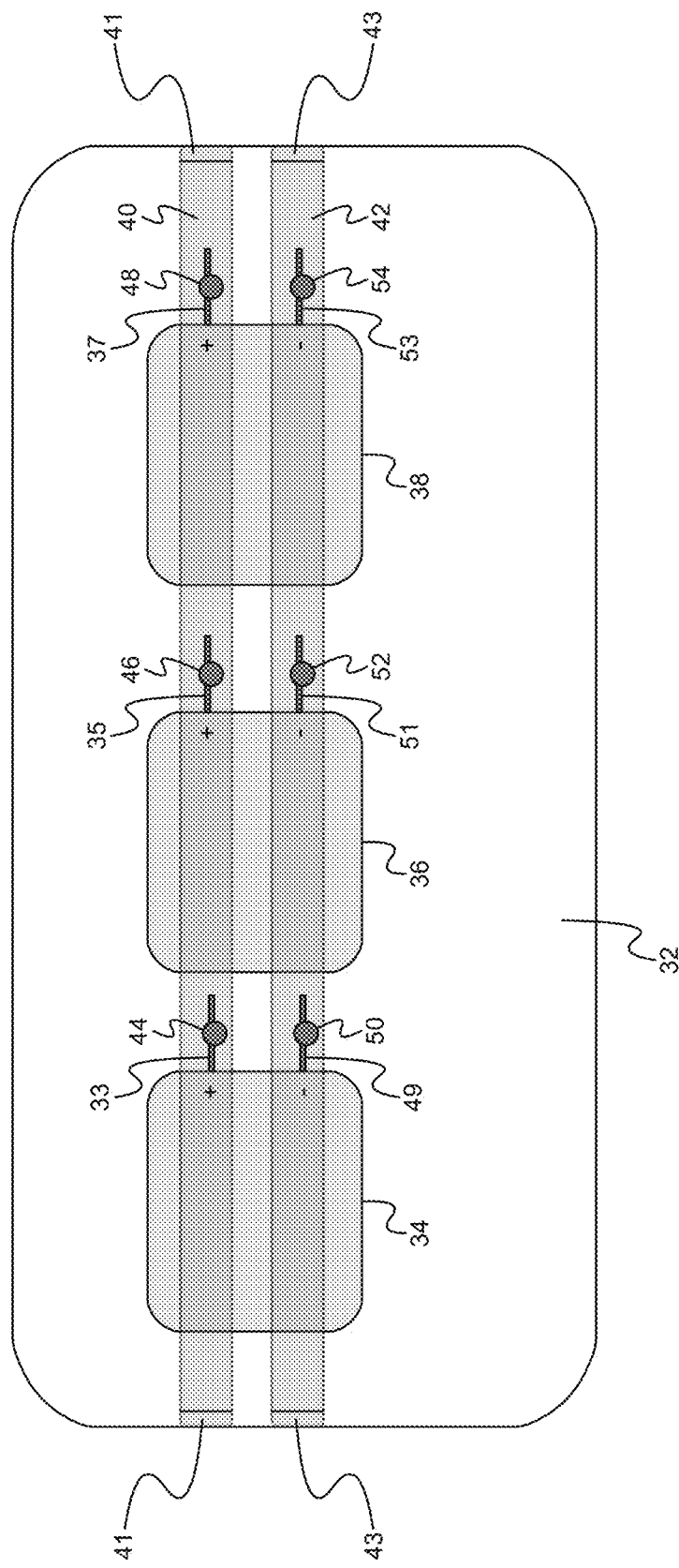
FIG. 4 illustrates a top down view of another flexible and stretchable chain battery according to some embodiments.

In some embodiments, the batteries can be positioned between the stretchable substrate and the stretchable conductive cloths. FIG. 4 illustrates a top down view of another flexible and stretchable chain battery according to some embodiments. The flexible and stretchable chain battery shown in FIG. 4 is similar to the flexible and stretchable chain battery in FIG. 1 except that the batteries in FIG. 4 are positioned between the stretchable substrate and the stretchable conductive cloths. The flexible and stretchable chain battery includes a stretchable substrate 32, a stretchable conductive cloth 40, a stretchable conductive cloth 42, and batteries 34, 36 and 38. The stretchable conductive cloths 40, 42 are shown as see through so as to illustrate the underlying interconnects. It is understood that more or less than three batteries can be chained together. The positive terminal of each battery 34, 36, 38 is electrically and mechanically coupled to the stretchable conductive cloth 40, and the negative terminal of each battery 34, 36, 38 is electrically and mechanically coupled to the stretchable conductive cloth 42. In some embodiments, the positive terminal and negative terminal of each battery 34, 36, 38 includes an electrically conductive element, such as a battery tab, that extends beyond a footprint of the battery so as to enable the mechanical and electrical connection with the corresponding stretchable conductive cloth. For example, the positive terminal of the battery 34 includes a battery tab 33 that extends beyond a footprint of the battery 34, and the battery tab 33 is mechanically and electrically coupled to the stretchable conductive cloth 40 forming a tab connection 44. The negative terminal of the battery 34 includes a battery tab 49 that extends beyond a footprint of the battery 34, and the battery tab 49 is mechanically and electrically coupled to the stretchable conductive cloth 42 forming a tab connection 50. Similarly, the positive terminal of the battery 36 includes a battery tab 35 that extends beyond a footprint of the battery 36, and the battery tab 35 is mechanically and electrically coupled to the stretchable conductive cloth 40 forming a tab connection 46. The negative terminal of the battery 36 includes a battery tab 51 that extends beyond a footprint of the battery 36, and the battery tab 51 is mechanically and electrically coupled to the stretchable conductive cloth 42 forming a tab connection 52. The positive terminal of the battery 38 includes a battery tab 37 that extends beyond a footprint of the battery 38, and the battery tab 37 is mechanically and electrically coupled to the stretchable conductive cloth 40 forming a tab connection 48. The negative terminal of the battery 38 includes a battery tab 53 that extends beyond a footprint of the battery 38, and the battery tab 53 is mechanically and electrically coupled to the stretchable conductive cloth 42 forming a tab connection 54. In some embodiments, an adhesive is applied around and/or onto each tab connection to provide additional mechanical connection and environmental protection.

In some embodiments, the ends of each stretchable conductive cloth 40, 42 can be fitted with an electrical connection point, such as a contact pad 41, 43 or metal fastener, so as to electrically interconnect the stretchable conductive cloth 40, 42 to an external electrical component or other electrical interconnect (not shown).

In the embodiment shown in FIG. 4, the top and bottom edges (where "top" and "bottom" are simply relative terms based on the orientation shown in FIG. 4) are uncovered by the stretchable conductive cloths 40, 41. In other embodiments, the stretchable conductive cloths can each be formed to cover a top or bottom edge of each battery. For example, the stretchable conductive cloth 40 shown in FIG. 4 can be formed wider so that a top edge of the stretchable conductive cloth extends beyond a footprint of the top edge of the batteries 34, 36, 38. Similarly, the stretchable conductive cloth 42 shown in FIG. 4 can be formed wider so that a bottom edge of the stretchable conductive cloth extends beyond a footprint of the bottom edge of the batteries 34, 36, 38. The portions of the stretchable conductive cloths 40, 42 overlapping with the stretchable substrate 32 are attached to the stretchable substrate 32, for example using flexible adhesive or by lamination.

Figure 5:
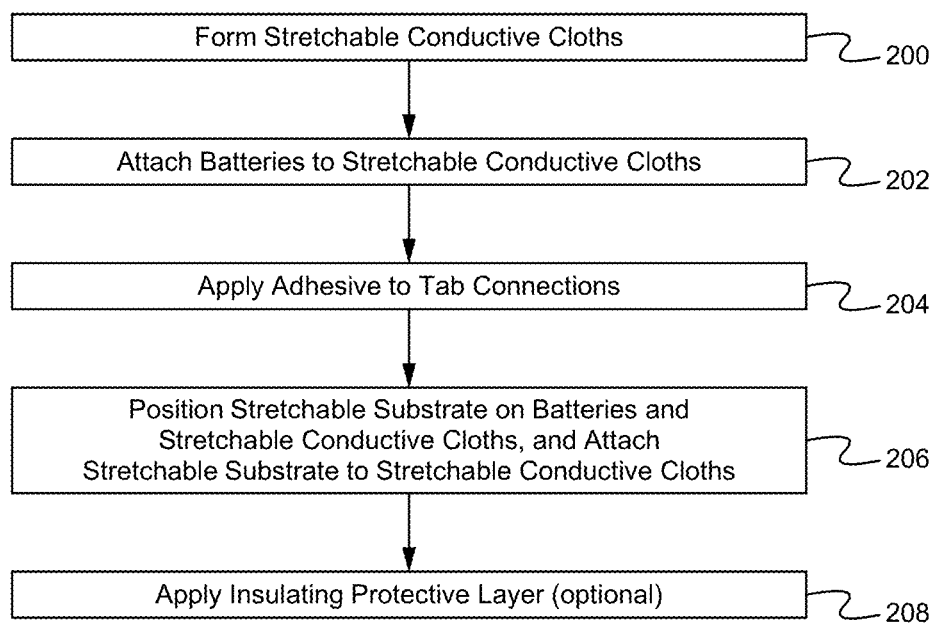
FIG. 5 illustrates another method of making a flexible and stretchable chain battery according to some embodiments.

FIG. 5 illustrates another method of making a flexible and stretchable chain battery according to some embodiments. For exemplary purposes, the method of FIG. 5 is described in terms of the flexible and stretchable chain battery of FIG. 4. At the step 200, the stretchable conductive cloth 40 and the stretchable conductive cloth 42 are formed to the desired configurations. In some embodiments, the stretchable conductive cloth 40 and the stretchable conductive cloth 42 are cut, such as by laser cutting or other cutting means, to the desired configurations. It is understood that alternative conventional methods can be used to form the stretchable conductive cloths into the desired configurations. FIG. 4 shows each of the stretchable conductive cloth 40 and the stretchable conductive cloth 42 shaped as rectangular, linear strips. It is understood that the stretchable conductive cloths can be alternatively configured with different shapes and pathways. In some embodiments, electrical interconnect points 41 are formed on each end of the stretchable conductive cloth 40 and electrical interconnect points 43 are formed on each end of the stretchable conductive cloth 42.

At the step 202, each of the batteries 34, 36, 38 are selectively attached to the stretchable conductive cloths 40, 42. The battery 34 is positioned such that the battery tab 33 of the positive terminal is aligned with the stretchable conductive cloth 40 and the battery tab 49 of the negative terminal is aligned with the stretchable conductive cloth 42. Similarly, the battery 36 is positioned such that the battery tab 35 of the positive terminal is aligned with the stretchable conductive cloth 40 and the battery tab 51 of the negative terminal is aligned with the stretchable conductive cloth 42, and the battery 38 is positioned such that the battery tab 37 of the positive terminal is aligned with the stretchable conductive cloth 40 and the battery tab 53 of the negative terminal is aligned with the stretchable conductive cloth 42. The battery tabs 33, 35, 37 are mechanically and electrically connected to the stretchable conductive cloth 40 to form tab connections 44, 46, 48, respectively. The battery tabs 49, 51, 33 are mechanically and electrically connected to the stretchable conductive cloth 42 to form tab connections 50, 52, 54, respectively. In this manner, the positive terminal of each battery 32, 34, 36 is electrically interconnected to the stretchable conductive cloth 40, and the negative terminal of each battery 32, 34, 36 is electrically interconnected to the stretchable conductive cloth 42. Each battery tab 33, 35, 37 can be connected to the stretchable conductive cloth 40 and each battery tab 49, 51, 53 can be connected to the stretchable conductive cloth 42 through any of various connection means including, but not limited to, soldering, welding, conductive adhesive or mechanical clip/fastener.

In some embodiments, a body portion of each of the batteries 34, 36, 38 is mechanically attached to the stretchable conductive cloths 40, 42. Such a mechanical attachment can be formed using, for example, an adhesive applied to an entire or a portion of a contact surface between the stretchable conductive cloths and the batteries. In other embodiments, the body portion of each battery 34, 36, 38 is not secured to either of the stretchable conductive cloths 40, 42.

At the step 204, an adhesive is applied over each tab connection 44, 46, 48, 50, 52, 54 to provide additional mechanical connection and environmental protection.

At the step 206, the stretchable substrate 32 is positioned on the batteries 34, 36, 38 and stretchable conductive cloths 40, 42. If the surface of each battery that is contacting the stretchable conductive cloths 40, 42 is considered a first surface, then the stretchable substrate 32 is positioned on a second surface of each of the batteries 34, 36, 38 opposite the first surface. In some embodiments, the stretchable substrate 32 is mechanically attached to the stretchable conductive cloths 40, 42, each battery 34, 36, 38 or a combination of the stretchable conductive cloths 40, 42 and each battery 34, 36, 38. Such a mechanical attachment can be formed using, for example, a flexible adhesive applied to an entire or a portion of a contact surface between the stretchable substrate and the batteries, the stretchable conductive cloths, or both the batteries and the stretchable conductive cloths. In other embodiments, the stretchable conductive cloth 40 and the stretchable conductive cloth 22 are laminated to the stretchable substrate 32. In still other embodiments, the batteries 34, 36, 38 are not secured to the stretchable substrate 32 so as to be free floating relative to the stretchable substrate 32. The batteries can be held in place by stretchable conductive cloths formed to cover a top or bottom edge of each battery. For example, the stretchable conductive cloth 40 shown in FIG. 4 can be formed wider so that a top edge of the stretchable conductive cloth extends beyond a footprint of the top edge of the batteries 34, 36, 38. Similarly, the stretchable conductive cloth 42 shown in FIG. 4 can be formed wider so that a bottom edge of the stretchable conductive cloth extends beyond a footprint of the bottom edge of the batteries 34, 36, 38. The portion of the stretchable conductive cloths 40, 42 that extend past the edges of the battery can be attached the stretchable substrate 32. In this manner, the stretchable conductive cloths form pockets into which the batteries can fit.

At an optional step 208, an insulting protective layer is applied over the stretchable conductive cloths 40, 42, and the batteries 34, 36, 38. Examples of such an insulting protective cover includes, but is not limited to, a silicon gel, a urethane gel or another layer of the stretchable substrate material. In some embodiments, the electrical interconnect points 41, 43 of each stretchable conductive cloth 40, 42 are left exposed so as to provide external electrical connectivity.

The embodiments described above are directed to structures where the batteries and stretchable conductive cloths are positioned on the same side of the stretchable substrate. Alternatively, the batteries can be positioned on an opposite side of the stretchable substrate as the stretchable conductive cloths. FIG. 6 illustrates a top down view of still another flexible and stretchable chain battery according to some embodiments. FIG. 7 illustrates a bottom up view of the flexible and stretchable chain battery of FIG. 6. The flexible and stretchable chain battery includes a stretchable substrate 62, a stretchable conductive cloth 70, a stretchable conductive cloth 72, and batteries 64, 65, 66, 67, 68, 69. The batteries 64, 65, 66, 67, 68, 69 are mechanically coupled to a first surface of the stretchable substrate 62, as shown in FIG. 6. It is understood that more or less than six batteries can be chained together. The positive terminal of each battery 64, 65, 66, 67, 68, 69 is electrically coupled to the stretchable conductive cloth 70, and the negative terminal of each battery 64, 65, 66, 67, 68, 69 is electrically coupled to the stretchable conductive cloth 72. In some embodiments, the positive terminal and negative terminal of each battery 64, 65, 66, 67, 68, 69 includes an electrically conductive element, such as a battery tab, that extends beyond a footprint of the battery so as to enable the electrical connection with the corresponding stretchable conductive cloth. For example, the positive terminal of the battery 64 includes a battery tab 58 that extends beyond a footprint of the battery 64, the positive terminal of the battery 65 includes a battery tab 55 that extends beyond a footprint of the battery 65, the positive terminal of the battery 66 includes a battery tab 59 that extends beyond a footprint of the battery 66, the positive terminal of the battery 67 includes a battery tab 56 that extends beyond a footprint of the battery 67, the positive terminal of the battery 68 includes a battery tab 60 that extends beyond a footprint of the battery 68, and the positive terminal of the battery 69 includes a battery tab 57 that extends beyond a footprint of the battery 69. The negative terminal of the battery 64 includes a battery tab 93 that extends beyond a footprint of the battery 64, the negative terminal of the battery 65 includes a battery tab 61 that extends beyond a footprint of the battery 65, the negative terminal of the battery 66 includes a battery tab 95 that extends beyond a footprint of the battery 66, the negative terminal of the battery 67 includes a battery tab 63 that extends beyond a footprint of the battery 67, the negative terminal of the battery 68 includes a battery tab 97 that extends beyond a footprint of the battery 68, and the negative terminal of the battery 69 includes a battery tab 91 that extends beyond a footprint of the battery 69. The battery tab 58 and the battery tab 55 are mechanically and electrically coupled forming a tab connection 74. The battery tab 93 and the battery tab 61 are mechanically and electrically coupled forming a tab connection 80. The battery tab 59 and the battery tab 56 are mechanically and electrically coupled forming a tab connection 76. The battery tab 95 and the battery tab 63 are mechanically and electrically coupled forming a tab connection 82. The battery tab 60 and the battery tab 57 are mechanically and electrically coupled forming a tab connection 96. The battery tab 97 and the battery tab 91 are mechanically and electrically coupled forming a tab connection 84.

The tab connections 74, 76, 80, 82, 84, 96 each extend through the entire thickness of the stretchable substrate 62 and provide a connection point on both the first surface of the stretchable substrate 62, as shown in FIG. 6, and the second surface of the stretchable substrate 62, as shown in FIG. 7. The stretchable conductive cloth 70 includes a main portion 71 and extension portions 75, 77, 79. The extension portion 75 is mechanically and electrically coupled to the tab connection 74. The extension portion 77 is mechanically and electrically coupled to the tab connection 76. The extension portion 79 is mechanically and electrically coupled to the tab connection 96. The stretchable conductive cloth 72 includes a main portion 73 and extension portions 81, 83, 85. The extension portion 81 is mechanically and electrically coupled to the tab connection 80. The extension portion 83 is mechanically and electrically coupled to the tab connection 82. The extension portion 85 is mechanically and electrically coupled to the tab connection 84.

In some embodiments, an adhesive is applied around and/or onto each tab connection on both the first surface and the second surface of the stretchable substrate to provide additional mechanical connection and environmental protection. In some embodiments, the ends of each stretchable conductive cloth 70, 22 are fitted with an electrical connection point, such as a contact pad 86, 87, 88, 89 or metal fastener, so as to electrically interconnect the stretchable conductive cloth 70, 72 to an external electrical component or other electrical interconnect (not shown).

An optional insulting protective layer can be applied over the stretchable conductive cloths 70, 72, including the main portions 71, 73 and the extension portions 75, 77, 79, 81, 83, 85, the tab connections 74, 76, 81, 83, 85, 96 and all or some of the exposed second surface of the stretchable substrate 62. An optional insulting protective layer can also be applied over the batteries 64, 65, 66, 67, 68, 69 including the battery tabs 55, 56, 57, 58, 59, 60, 61, 63, 91, 93, 95, 97, the tab connections 74, 76, 81, 83, 85, 96 and all or some of the exposed first surface of the stretchable substrate 62. Examples of such an insulting protective cover includes, but is not limited to, a silicon gel, a urethane gel or another layer of the stretchable substrate material. In some embodiments, the electrical interconnect points 86, 87, 88, 89 of each stretchable conductive cloth 70, 72 are left exposed so as to provide external electrical connectivity.

Figure 8:
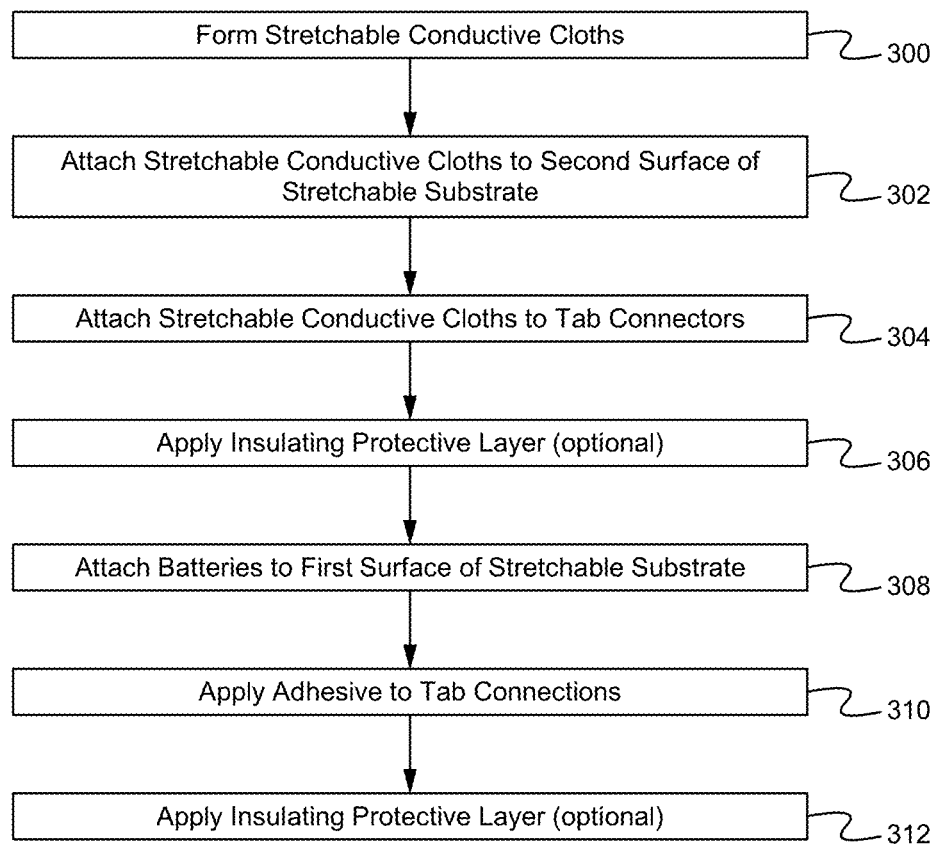
FIG. 8 illustrates yet another method of making a flexible and stretchable chain battery according to some embodiments.

FIG. 8 illustrates yet another method of making a flexible and stretchable chain battery according to some embodiments. For exemplary purposes, the method of FIG. 8 is described in terms of the flexible and stretchable chain battery of FIGS. 6 and 7. At the step 300, the stretchable conductive cloth 70 and the stretchable conductive cloth 72 are formed to the desired configurations including the main portions 71, 73 and the extension portions 75, 77, 79, 81, 83, 85. In some embodiments, the stretchable conductive cloth 70 and the stretchable conductive cloth 72 are cut, such as by laser cutting or other cutting means, to the desired configurations. It is understood that alternative conventional methods can be used to form the stretchable conductive cloths into the desired configurations. FIG. 4 shows each of the stretchable conductive cloth 70 and the stretchable conductive cloth 72 shaped as rectangular, linear main portion strips and extension portion strips. It is understood that the stretchable conductive cloths can be alternatively configured with different shapes and pathways. In some embodiments, electrical interconnect points 86, 87 are formed on each end of the stretchable conductive cloth 70 and electrical interconnect points 88, 89 are formed on each end of the stretchable conductive cloth 72.

At the step 302, the stretchable conductive cloth 70 and the stretchable conductive cloth 72 are attached to the second surface of the stretchable substrate 62. In some embodiments, the stretchable conductive cloth 70 and the stretchable conductive cloth 72 are laminated to the second surface of the stretchable substrate 62. In other embodiments, the stretchable conductive cloth 70 and the stretchable conductive cloth 72 are each attached to the stretchable substrate 62 using a flexible adhesive. The flexible adhesive is cured, in some embodiments at room temperature. In some embodiments, the flexible adhesive is applied substantially along an entire contact surface between the stretchable conductive cloth and the stretchable substrate. In this case, the flexible adhesive is an adhesive that has sufficient stretchability to stretch along with the stretchable conductive cloth. In other embodiments, the flexible adhesive not applied along the entire contact surface between the stretchable conductive cloth and the stretchable substrate, but instead is applied at select locations along the contact surface between the stretchable conductive cloth and the stretchable substrate. In this case, the flexible adhesive need not have the same stretchability as the stretchable conductive cloth. In still other embodiments, where the stretchable conductive interconnect is stretchable conductive ink instead of stretchable conductive cloth, the stretchable conductive interconnects can be printed onto the stretchable substrate. In this case, there is no need to perform step 300.

At the step 304, each extension portion 75, 77, 79 of the stretchable conductive cloth 70 is mechanically and electrically connected to the corresponding tab connector 74, 76, 96, respectively, attached through the stretchable substrate 62, and each extension portion 81, 83, 85 of the stretchable conductive cloth 72 is mechanically and electrically connected to the corresponding tab connector 80, 82, 84, respectively, attached through the stretchable substrate 62. In some embodiments, the tab connectors 74, 76, 80, 82, 84, 96 are pre-attached to the stretchable substrate 62 prior to the step 302. In other embodiments, the tab connectors 74, 76, 80, 82, 84, 96 are attached to the stretchable substrate 62 after the step 302. The tab connectors 74, 76, 80, 82, 84, 96 extend through the entire thickness of the stretchable substrate 62 so as to provide first connection points on the first surface of the stretchable substrate 62 and second connection points on the second surface of the stretchable substrate 62. Tab connections are formed on the tab connectors 74, 76, 80, 82, 84, 96 using any of the connection means previously described.

At an optional step 306, an insulting protective layer is applied the stretchable conductive cloths 70, 72, including the main portions 71, 73 and the extension portions 75, 77, 79, 81, 83, 85, the tab connections 74, 76, 81, 83, 85, 96 and all or some of the exposed second surface of the stretchable substrate 62. Examples of such an insulting protective cover includes, but is not limited to, a silicon gel, a urethane gel or another layer of the stretchable substrate material. In the case where the insulting protective layer is another layer of the stretchable substrate material, the insulating protective layer can be laminated to the stretchable conductive cloths 70, 72 and exposed portions of the second surface of the stretchable substrate 62. In some embodiments, the electrical interconnect points 86, 87, 88, 89 of each stretchable conductive cloth 70, 72 are left exposed so as to provide external electrical connectivity.

At the step 308, each of the batteries 64, 65, 66, 67, 68, 69 are selectively attached to the first surface of the stretchable substrate 62, such as by adhesive. The battery 64 is positioned such that the battery tab 58 of the positive terminal is aligned with the tab connector 74 and the battery tab 93 of the negative terminal is aligned with the tab connector 80. Similarly, the battery 65 is positioned such that the battery tab 55 of the positive terminal is aligned with the tab connector 74 and the battery tab 61 of the negative terminal is aligned with the tab connector 80. The battery 66 is positioned such that the battery tab 59 of the positive terminal is aligned with the tab connector 76 and the battery tab 95 of the negative terminal is aligned with the tab connector 82. The battery 67 is positioned such that the battery tab 56 of the positive terminal is aligned with the tab connector 76 and the battery tab 63 of the negative terminal is aligned with the tab connector 82. The battery 68 is positioned such that the battery tab 60 of the positive terminal is aligned with the tab connector 96 and the battery tab 97 of the negative terminal is aligned with the tab connector 84. The battery 69 is positioned such that the battery tab 57 of the positive terminal is aligned with the tab connector 96 and the battery tab 91 of the negative terminal is aligned with the tab connector 84. The battery tabs 55, 58 are mechanically and electrically connected to the tab connector 74, the battery tabs 61, 93 are mechanically and electrically connected to the tab connector 80, the battery tabs 56, 59 are mechanically and electrically connected to the tab connector 76, the battery tabs 63, 95 are mechanically and electrically connected to the tab connector 82, the battery tabs 57, 60 are mechanically and electrically connected to the tab connector 96, and the battery tabs 91, 97 are mechanically and electrically connected to the tab connector 84 to form the tab connections. In this manner, the positive terminal of each battery 64, 65, 66, 67, 68, 69 is electrically interconnected to the stretchable conductive cloth 70, and the negative terminal of each battery 64, 65, 66, 67, 68, 69 is electrically interconnected to the stretchable conductive cloth 72. Mechanical and electrical connection is accomplished through any of various connection means including, but not limited to, soldering, welding or conductive adhesive.

At the step 310, an adhesive is applied over each tab connection 74, 76, 81, 83, 85, 96 to provide additional mechanical connection and environmental protection.

At an optional step 312, an insulting protective layer can also be applied over the batteries 64, 65, 66, 67, 68, 69 including the battery tabs 55, 56, 57, 58, 59, 60, 61, 63, 91, 93, 95, 97, the tab connections 74, 76, 81, 83, 85, 96 and all or some of the exposed first surface of the stretchable substrate 62. Examples of such an insulting protective cover includes, but is not limited to, a silicon gel, a urethane gel or another layer of the stretchable substrate material. In some embodiments, the electrical interconnect points 86, 87, 88, 89 of each stretchable conductive cloth 70, 72 are left exposed so as to provide external electrical connectivity.

Figure 9:
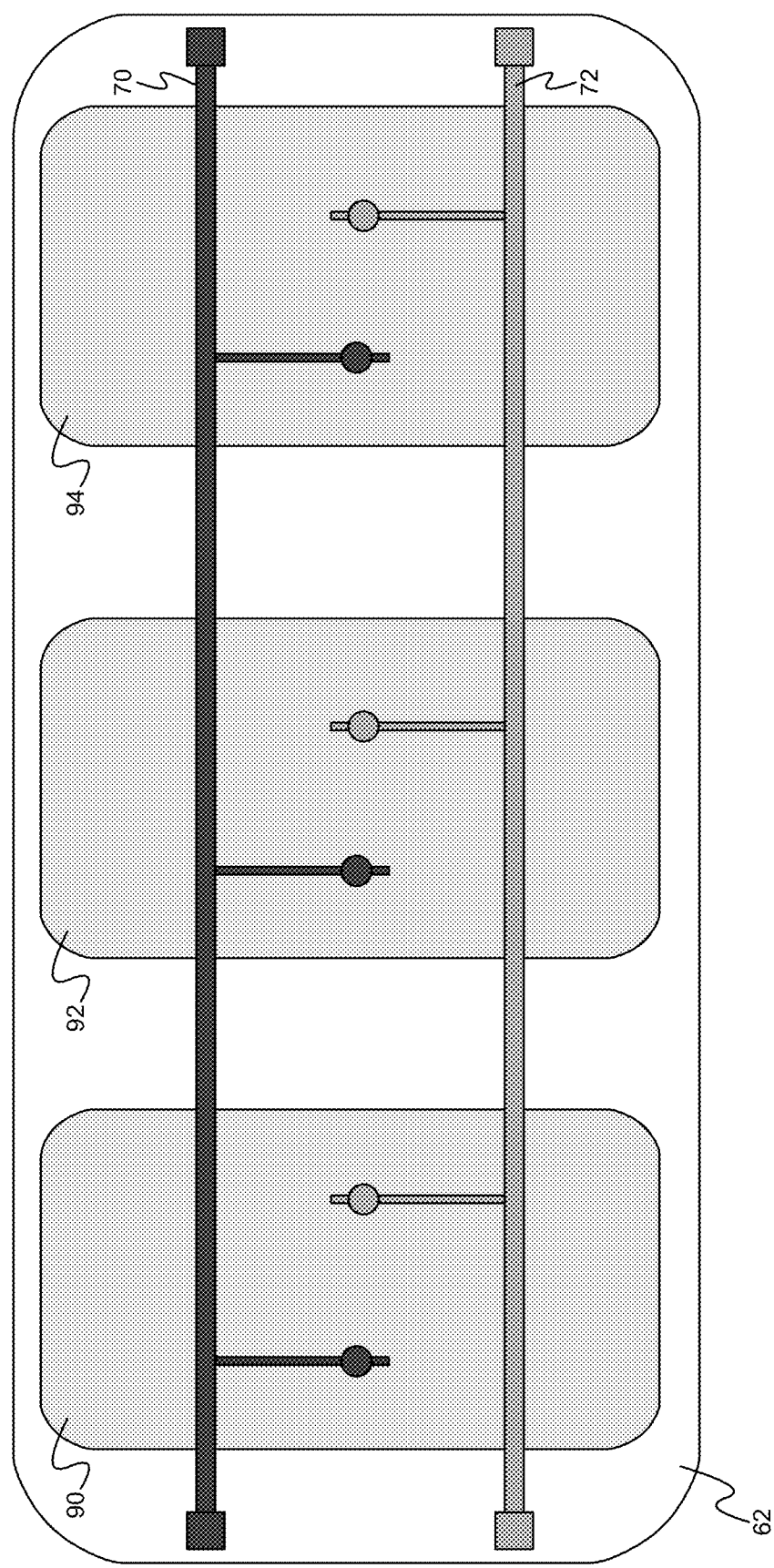
FIG. 9 illustrates the bottom up view of the flexible and stretchable chain battery of FIG. 7 with a mechanical stiffener positioned for each battery pair.

In some embodiments, an additional support structure is added to support the batteries, while still enabling areas between the batteries to stretch. In an exemplary application, a mechanical stiffener can be added to the flexible and stretchable chain battery of FIGS. 6 and 7. In particular, a mechanical stiffener can be positioned on the second surface of the elastic substrate 62 and aligned with the battery on the first surface. The mechanical stiffener can be positioned between the stretchable substrate 62 and the stretchable conductive cloths 70, 72. A mechanical stiffener can be positioned for each individual battery, or a mechanical stiffener can be positioned for each battery pair. FIG. 9 illustrates the bottom up view of the flexible and stretchable chain battery of FIG. 7 with a mechanical stiffener positioned for each battery pair. Specifically, a mechanical stiffener 90 is positioned on the stretchable substrate 62, between the stretchable substrate 62 and the stretchable conductive cloths 70, 72, and aligned opposite the battery pari 64, 65. A mechanical stiffener 92 is positioned on the stretchable substrate 62, between the stretchable substrate 62 and the stretchable conductive cloths 70, 72, and aligned opposite the battery pari 66, 67. A mechanical stiffener 94 is positioned on the stretchable substrate 62, between the stretchable substrate 62 and the stretchable conductive cloths 70, 72, and aligned opposite the battery pari 68, 69.

The embodiments above show the battery chain in various connections. It is understood that the battery chain can be configured in a series, in parallel, or in any combination using both serial and parallel connections.

The present application has been described in terms of specific embodiments incorporating details to facilitate the understanding of the principles of construction and operation of the flexible and stretchable chain battery. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A flexible and stretchable chain battery comprising:
   a. a stretchable substrate;
   b. a first stretchable conductive interconnect coupled to the stretchable substrate;
   c. a second stretchable conductive interconnect coupled to the stretchable substrate; and
   d. a plurality of batteries, each battery comprising a positive terminal and a negative terminal, wherein the positive terminal of each battery is coupled to the first stretchable conductive interconnect and the negative terminal of each battery is coupled to the second stretchable conductive interconnect.

2. The chain battery of claim 1 wherein each battery comprises a positive terminal battery tab that extends beyond a footprint of the battery and a negative terminal battery tab that extends beyond a footprint of the battery.

3. The chain battery of claim 2 wherein the positive terminal battery tab of each battery is mechanically and electrically connected to the first stretchable conductive interconnect and the negative terminal battery tab of each battery is mechanically and electrically connected to the second stretchable conductive interconnect.

4. The chain battery of claim 1 further comprises flexible adhesive to selectively adhere the first stretchable conductive interconnect to the stretchable substrate and to selectively adhere the second stretchable conductive interconnect to the stretchable substrate.

5. The chain battery of claim 1 wherein the first stretchable conductive interconnect comprises a first end having a first contact pad and a second end having a second contact pad, and the second stretchable conductive interconnect comprises a first end having a first contact pad and a second end having a second contact pad.

6. The chain battery of claim 1 wherein the stretchable substrate comprises one of an elastic polymer, elastomer, silicone, urethane, polydimethlsiloxane (PDMS), latex, spandex or thermoplastic polyurethane film.

7. A flexible and stretchable chain battery comprising:
   a. a stretchable substrate having a first surface and an opposing second surface;
   b. a first stretchable conductive interconnect coupled to the first surface of the stretchable substrate;
   c. a second stretchable conductive interconnect coupled to the first surface of the stretchable substrate; and
   d. a plurality of batteries coupled to the first stretchable conductive interconnect, the second stretchable conductive interconnect and the first surface of the stretchable substrate, each battery comprising a positive terminal and a negative terminal, wherein the positive terminal of each battery is coupled to the first stretchable conductive interconnect and the negative terminal of each battery is coupled to the second stretchable conductive interconnect.

8. The chain battery of claim 7 wherein each battery comprises a positive terminal battery tab that extends beyond a footprint of the battery and a negative terminal battery tab that extends beyond a footprint of the battery.

9. The chain battery of claim 8 wherein the positive terminal battery tab of each battery is mechanically and electrically connected to the first stretchable conductive interconnect and the negative terminal battery tab of each battery is mechanically and electrically connected to the second stretchable conductive interconnect.

10. The chain battery of claim 7 further comprises flexible adhesive to selectively adhere the first stretchable conductive interconnect to the stretchable substrate and to selectively adhere the second stretchable conductive interconnect to the stretchable substrate.

11. The chain battery of claim 7 wherein the first stretchable conductive interconnect comprises a first end having a first contact pad and a second end having a second contact pad, and the second stretchable conductive interconnect comprises a first end having a first contact pad and a second end having a second contact pad.

12. The chain battery of claim 7 wherein the stretchable substrate comprises one of an elastic polymer, elastomer, silicone, urethane, polydimethlsiloxane (PDMS), latex, spandex or thermoplastic polyurethane film.

13. The chain battery of claim 7 wherein each battery is positioned between the first stretchable conductive interconnect and the stretchable substrate and positioned between the second stretchable conductive interconnect and the stretchable substrate.

14. The chain battery of claim 7 wherein a portion of the first stretchable conductive interconnect and a portion of the second stretchable conductive interconnect are positioned between each battery and the stretchable substrate.

15. The chain battery of claim 14 wherein each battery is coupled to the portion of the first stretchable conductive interconnect and the portion of the second stretchable conductive interconnect by an adhesive.

16. A flexible and stretchable chain battery comprising:
   a. a stretchable substrate having a first surface and an opposing second surface;
   b. a plurality of tab connectors extending through the stretchable substrate from the first surface to the second surface, wherein the plurality of tab connectors are electrically conductive;
   c. a first stretchable conductive interconnect coupled to the second surface of the stretchable substrate and to a first set of the plurality of tab connectors;
   c. a second stretchable conductive interconnect coupled to the second surface of the stretchable substrate and to a second set of the plurality of tab connectors; and
   d. a plurality of batteries coupled to the first surface of the stretchable substrate, each battery comprising a positive terminal and a negative terminal, wherein the positive terminal of each battery is coupled to one of the first set of tab connectors and the negative terminal of each battery is coupled to one of the second set of tab connectors.

17. The chain battery of claim 16 wherein each battery comprises a positive terminal battery tab that extends beyond a footprint of the battery and a negative terminal battery tab that extends beyond a footprint of the battery.

18. The chain battery of claim 17 wherein the positive terminal battery tab of each battery is mechanically and electrically connected to one of the first set of tab connectors and the negative terminal battery tab of each battery is mechanically and electrically connected to one of the second set of tab connectors.

19. The chain battery of claim 16 further comprises flexible adhesive to selectively adhere the first stretchable conductive interconnect and the second stretchable conductive interconnect to the second surface of the stretchable substrate.

20. The chain battery of claim 16 wherein the first stretchable conductive interconnect comprises a first end having a first contact pad and a second end having a second contact pad, and the second stretchable conductive interconnect comprises a first end having a first contact pad and a second end having a second contact pad.

21. The chain battery of claim 16 wherein the stretchable substrate comprises one of an elastic polymer, elastomer, silicone, urethane, polydimethlsiloxane (PDMS), latex, spandex or thermoplastic polyurethane film.

22. The chain battery of claim 16 wherein each battery is coupled to the first surface of the stretchable substrate by an adhesive.

* * * * *